United States Patent
Zhao et al.

(10) Patent No.: US 11,618,294 B2
(45) Date of Patent: Apr. 4, 2023

(54) ACTIVE-PASSIVE DUAL MODE SWITCHABLE VEHICLE SUSPENSION SYSTEM AND SWITCHING METHOD THEREFOR

(71) Applicant: Yanshan University, Qinhuangdao (CN)

(72) Inventors: Dingxuan Zhao, Qinhuangdao (CN); Mingde Gong, Qinhuangdao (CN); Shuang Liu, Qinhuangdao (CN); Zhuxin Zhang, Qinhuangdao (CN); Zhiguo Sun, Qinhuangdao (CN); Tao Ni, Qinhuangdao (CN); Zhaoyang Yan, Qinhuangdao (CN); Qinghe Guo, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 81 days.

(21) Appl. No.: 17/497,912

(22) Filed: Oct. 9, 2021

(65) Prior Publication Data

US 2022/0097471 A1    Mar. 31, 2022

Related U.S. Application Data

(63) Continuation of application No. PCT/CN2020/104512, filed on Jul. 24, 2020.

(30) Foreign Application Priority Data

Aug. 7, 2019 (CN) .......................... 201910725158.8

(51) Int. Cl.
*B60G 17/08* (2006.01)
*B60G 17/018* (2006.01)

(52) U.S. Cl.
CPC ........... *B60G 17/018* (2013.01); *B60G 17/08* (2013.01)

(58) Field of Classification Search
CPC ............ B60G 99/002; B60G 2202/154; B60G 2202/413; B60G 2202/416;
(Continued)

(56) References Cited

U.S. PATENT DOCUMENTS 6,416,061 B1 *  7/2002  French ...................... F16F 9/36
                                                    280/124.159
10,766,330 B2 *  9/2020  Seto ................... B60G 17/0424
(Continued)

FOREIGN PATENT DOCUMENTS

JP        2008309325 A  * 12/2008  ......... F16H 61/0213

*Primary Examiner* — Toan C To
(74) *Attorney, Agent, or Firm* — IPro, PLLC; Na Xu

(57) ABSTRACT

An active-passive dual mode switchable vehicle suspension system is provided. The suspension system includes a filter, a hydraulic pump, a one-way valve, a power takeoff, a servo valve, a suspension cylinder, an overflow valve, an energy accumulator, a reversing valve, a first pressure sensor, a second pressure sensor, a controller, an oil tank and a displacement sensor. Further related is a switching method for the active-passive dual mode switchable vehicle suspension system. When the active and passive dual-mode switchable vehicle suspension system is switched between modes, an oil pressure in the rodless cavity of the suspension cylinder and an oil pressure in the energy accumulator are adjusted to be equal in advance, so that the stable switching of the active-passive suspension system can be realized, and the vibration of the vehicle body is eliminated when the existing active-passive suspension system is switched. Moreover, the accumulator and overflow valve can be shared in the active and passive suspension mode, thereby effectively reducing the use number of accumulators and overflow valves, greatly saving the layout space of the (Continued)

vehicle body, effectively reducing the total weight of the vehicle body, which is favorable to the lightweight of the vehicle chassis.

4 Claims, 1 Drawing Sheet

(58) Field of Classification Search
CPC .......... B60G 2202/44; B60G 2204/162; B60G 2300/08; B60G 2300/09; B60G 2500/10; B60G 2500/30; B60G 2600/182; B60G 2800/9123; B60G 17/08
See application file for complete search history.

(56) References Cited

U.S. PATENT DOCUMENTS

| | | | |
|---|---|---|---|
| 2010/0230876 A1* | 9/2010 | Inoue .................... | B60G 13/14 267/140.14 |
| 2011/0176940 A1* | 7/2011 | Ellis ................... | A61B 17/3203 417/399 |
| 2013/0060423 A1* | 3/2013 | Jolly .................... | B60W 50/14 701/38 |
| 2014/0070467 A1* | 3/2014 | Dehmel ................ | B60G 11/58 267/64.17 |
| 2014/0251470 A1* | 9/2014 | Bissbort ............... | F15B 11/167 137/565.17 |
| 2016/0001624 A1* | 1/2016 | Meissner ............... | F04B 27/04 280/124.16 |
| 2018/0345747 A1* | 12/2018 | Boon ................... | B60G 17/018 |
| 2020/0398632 A1* | 12/2020 | Newstead .............. | F16F 9/064 |

* cited by examiner

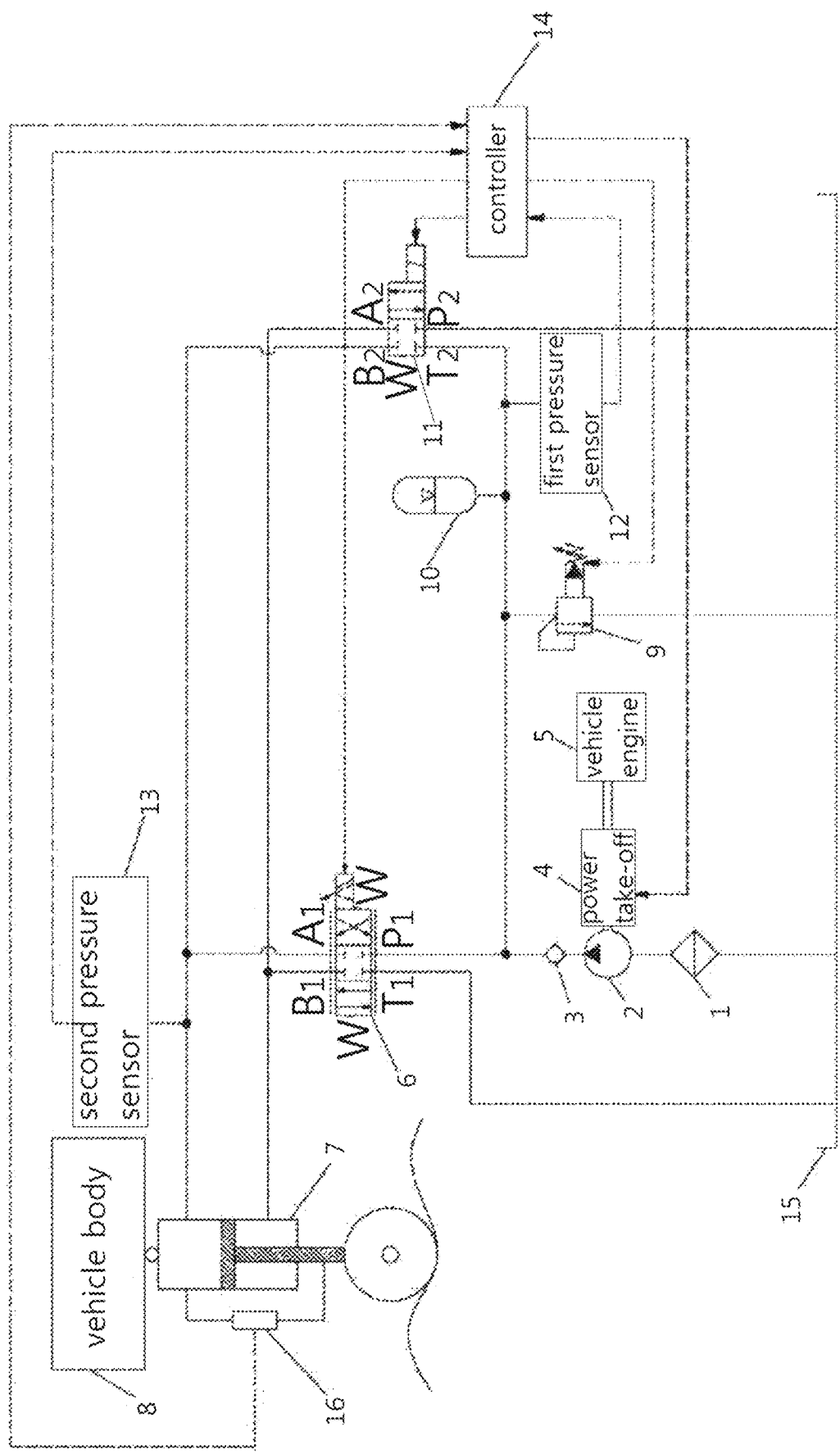

ACTIVE-PASSIVE DUAL MODE SWITCHABLE VEHICLE SUSPENSION SYSTEM AND SWITCHING METHOD THEREFOR

TECHNICAL FIELD

The present disclosure pertains to the technical field of a vehicle suspension, and in particular relates to an active suspension and passive suspension switchable suspension system and a switching method therefor.

BACKGROUND

A suspension system is an important component of a vehicle and has function of transmitting force and moment between wheels and a frame, buffering impact force transmitted to the body from the uneven road, and attenuating vibration caused thereby so as to ensure driving smoothness and operating stability of the vehicle. The active suspension has better vibration damping performance than the passive suspension, but the reliability of the active suspension is slightly worse than the passive suspension. If the vehicle is only equipped with the active suspension, once malfunction occurs, it is difficult to ensure driving safety and maneuverability of the vehicle. Therefore, the active suspension and the passive suspension are integrated into a vehicle body and can be switched at any time so that the driving safety and the maneuverability of the vehicle can be ensured while riding comfort is improved.

In the prior art, when the active suspension system and the passive suspension system integrated in a vehicle body are switched with each other, a problem of strong vibration will occur due to the unequal pressure of the two systems, and a greater potential safety risk exists. An effective work of the active suspension system needs an energy accumulator as an auxiliary power source, and an effective work of the passive suspension system needs an energy accumulator as an elastic element. In the prior art, the energy accumulator for active suspension and the energy accumulator for passive suspension are two independent elements, each of which plays its role. The energy accumulator has larger volume and quality than other hydraulic elements. If the number of the energy accumulator is large, it not only raises higher requirements for a limited layout space of the vehicle body, but also increases the weight of the vehicle body, which is unfavorable for the lightweight of the vehicle.

SUMMARY

In view of the above technical problems, an object of the present disclosure is to provide an active-passive dual mode switchable vehicle suspension system and a switching method therefor, which can realize smooth switching of working modes and allow an energy accumulator to be reused in two working modes.

First, the present disclosure provides an active-passive dual mode switchable vehicle suspension system, which includes a filter, a hydraulic pump, an one-way valve, a power take-off, a servo valve, a suspension cylinder, an overflow valve, an energy accumulator, a reversing valve, a first pressure sensor, a second pressure sensor, a controller, an oil tank and a displacement sensor;

an oil inlet of the filter is communicated with the oil tank through an oil pipe, and an oil outlet of the filter is communicated with an oil inlet of the hydraulic pump through an oil pipe; an oil outlet of the hydraulic pump is communicated with an oil inlet of the one-way valve through an oil pipe; an oil outlet of the one-way valve is communicated with an oil inlet of the servo valve through an oil pipe; and a return port of the servo valve is communicated with the oil tank through an oil pipe.

A drive shaft of the hydraulic pump is connected to the power take-off through a mechanical structure; the power take-off is connected to a power output shaft of a vehicle engine, and the power take-off is used to obtain power from the vehicle engine and transmit the power to the hydraulic pump.

The servo valve is a three-position four-way electro-hydraulic servo valve, which includes three states of a left position, a middle position and a right position; a first working oil port of the servo valve is communicated with a rodless cavity of the suspension cylinder, and a second working oil port of the servo valve is communicated with a rod cavity of the suspension cylinder; when the servo valve is at the middle position, all passages between the oil inlet, the return port of the servo valve and the first working oil port, the second working oil port of the servo valve are turned off; when the servo valve is at the left position, a passage between the oil inlet port of the servo valve and the first working oil port of the servo valve is turned on, and a passage between the return port of the servo valve and the second working oil port of the servo valve is turned on; when the servo valve is at the right position, a passage between the oil inlet port of the servo valve and the second working oil port of the servo valve is turned on, and a passage between the return port of the servo valve and the first working oil port of the servo valve is turned on.

The suspension cylinder is hinged to the vehicle body, and the suspension cylinder is provided with the displacement sensor to monitor the displacement of a piston rod relative to a hydraulic cylinder barrel.

An oil inlet of the overflow valve is communicated with an oil outlet of the one-way valve through an oil pipe, an oil outlet of the overflow valve is communicated with the oil tank through an oil pipe, and an opening pressure of the overflow valve is adjusted by giving a control signal to a control end of the overflow valve by the controller. The proportional overflow valve can be used as a safety valve for an active suspension system or as a safety valve for a passive suspension system.

The reversing valve and the servo valve are arranged in parallel, an oil inlet of the reversing valve is communicated with the oil tank through an oil pipe, and a return port of the reversing valve is communicated with the oil inlet of the overflow valve through an oil pipe; the first working oil port of the reversing valve is communicated with the rod cavity of the suspension cylinder through an oil pipe, and the second working oil port of the reversing valve is communicated with the rodless cavity of the suspension cylinder through an oil pipe.

The energy accumulator is arranged in an oil path between the return port of the reversing valve and the oil inlet of the overflow valve. The energy accumulator can be used as an auxiliary power source for the active suspension system or as an elastic element of the passive suspension system.

The first pressure sensor is provided in an oil path between the energy accumulator and the return port of the reversing valve, for detecting an oil pressure in the energy accumulator; the second pressure sensor is provided in an oil path between the rodless cavity of the suspension cylinder and the first working oil port of the servo valve, for detecting an oil pressure in the rodless cavity of the suspension cylinder.

A control end of the power take-off, a control end of the servo valve, a control end of the overflow valve and a control end of the reversing valve are all connected to the controller, and their signals are all given by the controller.

The servo valve is a three-position four-way electro-hydraulic servo valve, which includes three states of a left position, a middle position and a right position; when the servo valve is at the middle position, all passages between the oil inlet, the return ports of the servo valve and the first working oil port, the second working oil port of the servo valve are turned off; when the servo valve is at the left position, the passage between the oil inlet port of the servo valve and the first working oil port of the servo valve is turned on, and the passage between the oil return port of the servo valve and the second working oil port of the servo valve is turned on, and at this time, oil may enter the rodless cavity of the suspension cylinder through the oil inlet port of the servo valve and the first working oil port of the servo valve, and at the same time, oil in the rod cavity of the suspension cylinder may flow back to the oil tank through the second working oil port of the servo valve and the oil return port of the servo valve; when the servo valve is at the right position, the passage between the oil inlet port of the servo valve and the second working oil port of the servo valve is turned on, and the passage between the oil return port of the servo valve and the first working oil port of the servo valve is turned on, and at this time, the oil may enter the rod cavity of the suspension cylinder through the oil inlet port of the servo valve and the second working oil port of the servo valve, and at the same time, oil in the rodless cavity of the suspension cylinder may flow back to the oil tank through the first working oil port of the servo valve and the oil return port thereof.

Compared with the prior art, the present disclosure has beneficial effects as follows:

when the active and passive dual-mode switchable vehicle suspension system is switched between modes, the oil pressure in the rodless cavity of the suspension cylinder and the oil pressure in the energy accumulator are adjusted to be equal in advance, so that the stable switching of the active-passive suspension system can be realized, and the vibration of the vehicle body is eliminated when the existing active-passive suspension system is switched; in the active-passive dual-mode switchable vehicle suspension system of the present disclosure, the energy accumulator can be used as an auxiliary power source in an active suspension mode or as an elastic element in a passive suspension mode, and the overflow valve can be used as a safety valve in the active suspension mode and also as a safety valve in the passive suspension mode, and the use number of the energy accumulator and the overflow valve is effectively reduced, so that an arrangement space of the vehicle body can be greatly saved, and particularly for emergency rescue vehicles that need to be loaded with a variety of instruments and equipment, the suspension system of the present disclosure can reserve more installation space for other instruments and equipment on the vehicle body, and can effectively reduce the total mass of the vehicle body, and thus is favorable for lightweight of a vehicle chassis.

BRIEF DESCRIPTION OF THE DRAWINGS

FIG. 1 is a schematic view of an active-passive dual mode switchable vehicle suspension system of the present disclosure.

In the drawings, 1—filter, 2—hydraulic pump, 3—one-way valve, 4—power take-off, 5—vehicle engine, 6—servo valve, 7—suspension cylinder, 8—vehicle body, 9—overflow valve, 10—energy accumulator, 11—reversing valve, 12—first pressure sensor, 13—second pressure sensor, 14—controller, 15—oil tank, 16—displacement sensor, $P_1$—oil inlet of the servo valve, $T_1$—a return port of the servo valve, $A_1$—first working oil port of servo valve, $B_1$—second working oil port of the servo valve, $P_2$—oil inlet of the reversing valve, $T_2$—return port of the reversing valve, $A_2$—first working oil port of the reversing valve, $B_2$—second working oil port of the reversing valve.

DETAILED DESCRIPTION

The following detailed description of the embodiments of the present invention is provided in conjunction with the accompanying drawings, instead of limiting the scope of the present disclosure. It is to be understood that in the description of the present disclosure, the terms "front", "rear", "left", "center", "right", "upper", "lower", and the like indicate orientations or positional relationships based on those shown in the drawings, and are only for convenience in describing the present disclosure and simplifying the description, but do not indicate or imply that the device or element referred to must have a specific orientation, be constructed and operated in a specific orientation, and thus, cannot be construed as limiting the present disclosure. The terms "first", "second" and the like are used merely to simplify the written description to distinguish them from similar objects but not to be construed as specifying a sequential relationship between particular orders.

In this application, unless expressly stated or limited otherwise, the terms "mounted", "connected", "secured" and the like are to be construed broadly and can include, for example, fixed connections, removable connections, or integral connections; can be mechanically or electrically connected; they may be connected directly or indirectly through intervening media, or they may be interconnected between two elements. The specific meaning of the above terms in the present application can be understood by those of ordinary skill in the art as appropriate.

As shown in FIG. 1, an active-passive dual mode switchable vehicle suspension system disclosed in an embodiment of the present disclosure includes a filter 1, a hydraulic pump 2, a one-way valve 3, a power take-off 4, a servo valve 6, a suspension cylinder 7, a overflow valve 9, an energy accumulator 10, a reversing valve 11, a first pressure sensor 12, a second pressure sensor 13, a controller 14, an oil tank 15 and a displacement sensor 16.

An oil inlet of the filter 1 is communicated with the oil tank 15 through an oil pipe, an oil outlet of the filter 1 is communicated with an oil inlet of the hydraulic pump 2 through an oil pipe, an oil outlet of the hydraulic pump 2 is communicated with an oil inlet of the one-way valve 3 through an oil pipe, an oil outlet of the one-way valve 3 is communicated with an oil inlet $P_1$ of the servo valve through an oil pipe, and a return port $T_1$ of the servo valve is communicated with the oil tank 15 through an oil pipe.

A drive shaft of the hydraulic pump 2 is connected to the power take-off 4 through a mechanical structure, and the power take-off 4 is connected to a power output shaft of a vehicle engine 5. The power take-off 4 is used to obtain power from the vehicle engine 5 and transmit the power to the hydraulic pump 2.

A first working oil port A1 of the servo valve is communicated with a rodless cavity of the suspension cylinder 7, and a second working oil port B1 of the servo valve is communicated with a rod cavity of the suspension cylinder 7.

The suspension cylinder 7 is hinged to the vehicle body 8, and the suspension cylinder 7 is provided with the displacement sensor 16 to monitor the displacement of a piston rod relative to a hydraulic cylinder barrel.

An oil inlet of the overflow valve 9 is communicated with the oil outlet of the one-way valve 3 through an oil pipe, and an oil outlet of the overflow valve 9 is communicated with the oil tank 15 through an oil pipe.

The reversing valve 11 and the servo valve 6 are arranged in parallel, an oil inlet $P_2$ of the reversing valve is communicated with the oil tank 15 through an oil pipe, and a return port $T_2$ of the reversing valve is communicated with the oil inlet of the overflow valve 9 through an oil pipe. A first working oil port $A_2$ of the reversing valve is communicated with the rod cavity of the suspension cylinder 7 through an oil pipe, and an second working oil port $B_2$ of the reversing valve is communicated with the rodless cavity of the suspension cylinder 7 through an oil pipe.

The energy accumulator 10 is arranged in an oil path between the return port T2 of the reversing valve and the oil inlet of the overflow valve 9. The energy accumulator 10 can be used as an auxiliary power source for an active suspension system or used as an elastic element for a passive suspension system.

The first pressure sensor 12 is provided in an oil path between the energy accumulator 10 and the return port $T_2$ of the reversing valve, for detecting an oil pressure in the energy accumulator 10. The second pressure sensor 13 is provided in an oil path between the rodless cavity of the suspension cylinder 7 and the first working oil port A1 of the servo valve, for detecting an oil pressure in the rodless cavity of the suspension cylinder 7.

A control end of the power take-off 4, a control end of the servo valve 6, a control end of the overflow valve 9 and a control end of the reversing valve 11 are all connected to the controller 14, and their signals are all given by the controller 14.

The servo valve 6 is a three-position four-way electrohydraulic servo valve, including three states of a left position, a middle position and a right position; when servo valve 6 is at the middle position, all passages between the oil inlet P1 and the return port $T_1$ of the servo valve and the first working oil port $A_1$ and the second working oil port B1 of the servo valve are turned off; when the servo valve 6 is at the left position, a passage between the oil inlet $P_1$ of the servo valve and the first working oil port $A_1$ of the servo valve is turned on, and a passage between the return port $T_1$ of the servo valve and the second working oil port B1 of the servo valve is turned on, and at this time, oil may flow into the rodless cavity of the suspension cylinder 7 through the oil inlet $P_1$ of the servo valve and the first working oil port $A_1$ of the servo valve, and at the same time, the oil in the rod cavity of the suspension cylinder 7 may flow back to the oil tank 15 through the second working oil port $B_1$ of the servo valve and the return port $T_1$ of the servo valve; when the servo valve 6 is at the right position, a passage between the oil inlet port $P_1$ of the servo valve and the second working oil port $B_1$ of the servo valve is turned on, and a passage between the return port $T_1$ of the servo valve and the first working oil port $A_1$ of the servo valve is turned on, and at this time, the oil may flow into the rod cavity of the suspension cylinder 7 through the oil inlet $P_1$ of the servo valve and the second working oil port $B_1$ of the servo valve, and at the same time, the oil in the rodless cavity of the suspension cylinder 7 may flow back to the oil tank 15 through the first working oil port $A_1$ of the servo valve and the return port $T_1$ of the servo valve.

The overflow valve 9 is a proportional overflow valve. An opening pressure of the overflow valve 9 can be adjusted by the controller 14 in a manner of transmitting a control signal to the control end of the overflow valve 9. The overflow valve 9 can be used as a safety valve for the active suspension system or used as a safety valve for the passive suspension system.

The reversing valve 11 is a two-position four-way electromagnetic reversing valve, which includes two states of turning off and turning on. When the reversing valve 11 is in the turning-off state, all passages between the oil inlet $P_2$ and return port $T_2$ of the reversing valve and the first working oil port $A_2$ and the second working oil port $B_2$ of the reversing valve are turned off; when the reversing valve 11 is in the turning-on state, a passage between the oil inlet $P_2$ of the reversing valve and the first working oil port $A_2$ of the reversing valve, and a passage between the return port $T_2$ of the reversing valve and the second working oil port $B_2$ of the reversing valve are both turned on; oil in the rodless cavity of the suspension cylinder 7 may flow into the energy accumulator 10 through the second working oil port $B_2$ of the reversing valve and the return port $T_2$ of the reversing valve, and oil in the oil tank 15 may flow into the rod cavity of the suspension cylinder 7 through the oil inlet $P_2$ of the reversing valve and the first working oil port $A_2$ of the reversing valve. On the contrary, oil in the energy accumulator 10 may also flow into the rodless cavity of the suspension cylinder 7 through the return port $T_2$ of the reversing valve and the second working oil port $B_2$ of the reversing valve, and the oil in the rod cavity of the suspension cylinder 7 may also flow back to the oil tank 15 through the first working oil port $A_2$ of the reversing valve and the oil inlet $P_2$ of the reversing valve.

In the active-passive dual mode switchable vehicle suspension system of the present disclosure, when the system operates in the active suspension mode, working parts include the filter 1, the hydraulic pump 2, the one-way valve 3, the power take-off 4, the servo valve 6, the suspension cylinder 7, the overflow valve 9, the energy accumulator 10, the controller 14, the oil tank 15 and the displacement sensor 16. When the system operates in the passive suspension mode, the working parts include the suspension cylinder 7, the overflow valve 9, the energy accumulator 10, the reversing valve 11 and the oil tank 15.

In the active suspension mode, the power take-off 4 receives a signal and is continuously connected to the power output shaft of the vehicle engine 5 to drive the operation of the hydraulic pump 2. The control end of the servo valve 6 receives the control signal transmitted by the controller 14 and continues working. The overflow valve 9 continues to maintain its opening pressure at $p_a$ ($p_a$ is a maximum pressure for the safe operation of the active suspension system). At this time, the reversing valve 11 may not receive a signal and continue to be maintained in the turning-off state.

In the passive suspension mode, the power take-off 4 may not receive a signal and continue to be disconnected from the power output shaft of the vehicle engine 5. The servo valve 6 may not receive a signal and continue to be maintained at the middle position. The overflow valve 9 continuously maintains its opening pressure at $p_s$. The reversing valve 11 receives a signal and maintains in the turning-on state.

The switching method of the active-passive dual mode switchable vehicle suspension system of the present disclosure is as follows:

When the suspension system is in the active suspension mode, the reversing valve 11 is in the turning-off state, and the opening pressure of the overflow valve 9 at this time is the maximum pressure $p_a$ used for the safe operation of the active suspension system. The power take-off 4 is connected to power output shaft of the vehicle engine 5 and outputs the power to the hydraulic pump 2 to drive the working of the hydraulic pump 2. The controller 14 outputs a corresponding control signal to the control end of the servo valve 6 according to the driving condition and vehicle body condition to regulate the working thereof. At this time, the energy device 10 is used as the auxiliary power source of the active suspension system, and the overflow valve 9 is used as the safety valve of the active suspension system.

When the suspension system is in the passive suspension mode, the reversing valve 11 is in the turning-on state, and the opening pressure of the overflow valve 9 at this time is the maximum pressure $p_s$ used for the safe operation of the passive suspension system. The power take-off 4 is disconnected to the power output shaft of the vehicle engine 5, and the hydraulic pump 2 stops working. The servo valve 6 is at the middle position, while the energy accumulator 10 is used as the elastic element of the passive suspension system, and the overflow valve 9 is used as the safety valve of the passive suspension system.

S1, when the vehicle is parked and an active suspension is switched to a passive suspension, the controller 14 outputs a corresponding displacement command to the control end of the servo valve 6 according to a feedback signal of the displacement sensor; the servo valve 6 regulates movement of the piston rod of the suspension cylinder 7 to an middle position of its full stroke, and then the controller 14 stops outputting the signal to the servo valve; the servo valve 6 returns to the middle position, the oil is locked in the suspension cylinder 7; the controller 14 stops outputting signals to the power take-off 4, the power take-off 4 is disconnected from the power output shaft of the vehicle engine 5, and the hydraulic pump 2 stops working; at this time, the first pressure sensor 12 detects that the pressure value in the energy accumulator is $p_1$, and signal of the pressure value is transmitted to the controller 14, and the second pressure sensor detects that the pressure value in the rodless cavity of the suspension cylinder 7 is $p_2$, and then signal of the pressure value is transmitted to the controller 14; and the controller 14 compares the pressure values $p_1$ and $p_2$, and makes corresponding adjustments, specifically:

(1) if $p_1=p_2$, the controller 14 outputs a control signal to the control end of the reversing valve 11, adjusts the reversing valve 11 to be switched from the turning-off state to the turning-on state; the oil path between the rodless cavity of the suspension cylinder 7 and the energy accumulator 10 is turned on; the oil path between the rod cavity of the suspension cylinder 7 and the oil tank 15 is turned on; the controller 14 outputs a control signal to the control end of the overflow valve 9 to adjust its opening pressure to a maximum pressure $p_s$ for the safe operation of the passive suspension system; since $p_1$ is equal to $p_2$, there is no pressure difference when the reversing valve 11 is turned on, and the active suspension is smoothly switched to the passive suspension; at this time, the energy accumulator 10 is used as an elasticity element of the passive suspension, and the overflow valve 9 is used as a safety valve of the passive suspension system; and at this time, when the vehicle starts to travel, that is, travels in the passive suspension mode;

(2) if $p_1>p_2$, the controller 14 outputs a control signal to the control end of the overflow valve 9, adjusts the opening pressure of the overflow valve 9 to $p_2$, and the oil flows from the energy accumulator 10 back to the oil tank 15 through the overflow valve 9; when the first pressure sensor 12 monitors that the pressure of the energy accumulator 10 decreases to $p_2$, the controller 14 outputs a control signal to the control end of the overflow valve 9 to adjust its opening pressure to the maximum pressure $p_s$ for the safe operation of the passive suspension system; then the controller 14 outputs a control signal to the control end of the reversing valve 11 to switch the reversing valve from the turning-off state to the turning-on state; at this time, $p_1=p_2$, the active suspension is smoothly switched to the passive suspension, the energy accumulator 10 is used as the elastic element of the passive suspension, and the overflow valve 9 is used as the safety valve of the passive suspension system; and at this time, the vehicle starts to travel, that is, travels in the passive suspension mode;

(3) if $p_2>p_1$, the controller 14 outputs a control signal to the power take-off 4, and the power take-off 4 is reconnected to the output shaft of the vehicle engine 5 and obtains power therefrom and outputs the power to the hydraulic pump 2, and the hydraulic pump 2 operates, the oil flows into the energy accumulator 10 through the one-way valve 3, the oil pressure in the energy accumulator 10 rises, and when the pressure monitored by the first pressure sensor 12 rises to $p_2$, the controller 14 stops outputting the control signal to the power take-off 4; the power take-off 4 is disconnected from the output shaft of the vehicle engine 5; the hydraulic pump 2 stops working, and then the controller 14 outputs a control signal to the control end of the reversing valve 11, switches the reversing valve switch from the turning-off state to the turning-on state; at this time $p_1=p_2$, the active suspension is smoothly switched to the passive suspension, the energy accumulator 10 is used as the elastic element of the passive suspension, and the overflow valve 9 is used as the safety valve of the passive suspension system; and at this time, when the vehicle starts to travel, that is, travels in the passive suspension mode.

S2, when the vehicle is parked and the passive suspension is switched to the active suspension, the controller 14 stops outputting the signal to the reversing valve 11; the reversing valve 11 is switched from the turning-on state to the turning-off state, the oil is locked in the suspension cylinder 7, and subsequently the controller 14 outputs a control signal to the overflow valve 9 to adjust its opening pressure to $p_a$, and then the controller 14 outputs a control signal to the power take-off 4; the power take-off 4 is connected to the output shaft of the vehicle engine 5 and obtains power therefrom and outputs the power to the hydraulic pump 2, and the hydraulic pump 2 operates; the controller 14 outputs a corresponding displacement command to the control end of the servo valve 6 according to the feedback signal of the displacement sensor 16; after the servo valve 6 has regulated the movement of the piston rod of the suspension cylinder 7 to the middle position of its full stroke, the controller 14 stops outputting the control signal to the control end of the servo valve 6, and the servo valve 6 returns to the middle position state; at this point, the passive suspension has been smoothly switched to the active suspension state; when the vehicle starts to travels, the controller 14 outputs corresponding control signals to the control end of the servo valve 6 according to the driving road condition and the vehicle body condition to regulate its operation; at this time, the energy accumulator 10 is used as the auxiliary power element of the active suspension, and the overflow valve 9 is used as the safety valve of the active suspension system; and the vehicle starts to travels, that is, travels in the active suspension mode.

Finally, it should be noted that the above-mentioned embodiments are only used to illustrate the technical solution of the present disclosure, rather than limit the present disclosure. Although the present disclosure has been described in detail with reference to the foregoing embodiments, it should be understood by the person skilled in the art that it is allowable to modify or equivalently substitute the present disclosure; however, all technical solutions and improvements that do not depart from the spirit and scope of the present disclosure should be covered by the scope of the claims of the present disclosure.

What is claimed is:

1. An active-passive dual mode switchable vehicle suspension system, comprising
    a filter, a hydraulic pump, a one-way valve, a power take-off, a servo valve, a suspension cylinder, an overflow valve, an energy accumulator, a reversing valve, a first pressure sensor, a second pressure sensor, a controller, an oil tank and a displacement sensor; wherein
    the filter has an oil inlet communicated with the oil tank through an oil pipe, and has an oil outlet communicated with an oil inlet of the hydraulic pump through an oil pipe; the hydraulic pump has an oil outlet communicated with an oil inlet of the one-way valve through an oil pipe, the one-way valve has an oil outlet communicated with an oil inlet of the servo valve through an oil pipe, and the servo valve has a return port communicated with the oil tank through an oil pipe;
    the hydraulic pump has a drive shaft connected to the power take-off, and the power take-off is connected to a power output shaft of a vehicle engine;
    the servo valve is a three-position four-way electro-hydraulic servo valve, comprising three states of a left position, a middle position and a right position; the servo valve has a first working oil port communicated with a rodless cavity of the suspension cylinder, and a second working oil port communicated with a rod cavity of the suspension cylinder; when the servo valve is at the middle position, all passages between the oil inlet and return ports of the servo valve and the first working oil port and second working oil port of the servo valve are turned off, when the servo valve is at the left position, a passage between the oil inlet port of the servo valve and the first working oil port of the servo valve is turned on, and a passage between the return port of the servo valve and the second working oil port of the servo valve is turned on; when the servo valve is at the right position, a passage between the oil inlet port of the servo valve and the second working oil port of the servo valve is turned on, and a passage between the return port of the servo valve and the first working oil port of the servo valve is turned on;
    the suspension cylinder is hinged to the vehicle body, and the suspension cylinder is provided with the displacement sensor;
    the overflow valve has an oil inlet communicated with an oil outlet of the one-way valve through an oil pipe, and an oil outlet communicated with the oil tank through an oil pipe; an opening pressure of the overflow valve is adjusted in such manner that a control signal is given by the controller to a control end of the overflow valve;
    the reversing valve and the servo valve are arranged in parallel, the reversing valve has an oil inlet communicated with the oil tank through an oil pipe, and a return port communicated with the oil inlet of the overflow valve through an oil pipe; the first working oil port of the reversing valve is communicated with the rod cavity of the suspension cylinder through an oil pipe, and the second working oil port of the reversing valve is communicated with the rodless cavity of the suspension cylinder through an oil pipe;
    the energy accumulator is arranged in an oil path between the return port of the reversing valve and the oil inlet of the overflow valve;
    the first pressure sensor is provided in an oil path between the energy accumulator and the return port of the reversing valve, and the second pressure sensor is provided in an oil path between the rodless cavity of the suspension cylinder and the first working oil port of the servo valve; and
    a control signal output end of the controller is respectively connected with a control end of the power take-off, a control end of the servo valve, a control end of the overflow valve and a control end of the reversing valve.

2. The active-passive dual mode switchable vehicle suspension system according to claim 1, wherein the overflow valve is a proportional overflow valve.

3. The active-passive dual mode switchable vehicle suspension system according to claim 1, wherein,
    the reversing valve is a two-position four-way electromagnetic reversing valve, comprising two states of turning off and turning on; when the reversing valve is in the turning-off state, all passages between the oil inlet and return port of the reversing valve and the first working oil port and second working oil port of the reversing valve are turned off, when the reversing valve is in the turning-on state, a passage between the oil inlet of the reversing valve and the first working oil port of the reversing valve, and a passage between the return port of the reversing valve and the second working oil port of the reversing valve are both turned on.

4. A switching method using the active-passive dual mode switchable vehicle suspension system according to any one of claims 1 to 3, wherein the method comprises following steps:
    when the vehicle is parked and an active suspension is switched from to a passive suspension, the controller outputs a corresponding displacement command to the control end of the servo valve according to a feedback signal of the displacement sensor; the servo valve regulates movement of the piston rod of the cylinder to an middle position of its full stroke, and then the controller stops outputting the signal to the servo valve; the servo valve returns to the middle position state, the oil is locked in the suspension cylinder; the controller stops outputting signals to the power take-off, the power take-off is disconnected from the power output shaft of the vehicle engine, and the hydraulic pump stops working, at this time, the first pressure sensor detects that the pressure value in the energy accumulator is $p_1$, and a signal of the pressure value $p_1$ in the energy accumulator is transmitted to the controller, and the second pressure sensor detects that the pressure value in the rodless cavity of the suspension cylinder is $p_2$, and then a signal of the pressure value $p_2$ in the rodless cavity of the suspension cylinder is transmitted to the controller; and the controller compares the pressure values $p_1$ and $p_2$, and makes corresponding adjustments, specifically:

if $p_1=p_2$, the controller outputs a control signal to the control end of the reversing valve, adjusts the reversing valve to be switched from the turning-off state to the turning-on state; the oil path between the rodless cavity of the suspension cylinder and the energy accumulator is turned on; the oil path between the rod cavity of the suspension cylinder and the oil tank is turned on; the controller outputs a control signal to the control end of the overflow valve to adjust its opening pressure to a maximum pressure $p_s$ for the safe operation of the passive suspension system; since $p_1$ is equal to $p_2$, there is no pressure difference when the reversing valve is turned on, and the active suspension is smoothly switched to the passive suspension; at this time, the energy accumulator is used as an elasticity element of the passive suspension, and the overflow valve is used as a safety valve of the passive suspension system; and at this time, the vehicle starts to travel, that is, travels in a passive suspension mode;

if $p_1>p_2$, the controller outputs a control signal to the control end of the overflow valve, adjusts the opening pressure of the overflow valve to $p_2$, and the oil flows from the energy accumulator back to the oil tank via the overflow valve; when the first pressure sensor monitors that the pressure of the energy accumulator decreases to $p_2$, the controller outputs a control signal to the control end of the overflow valve to adjust its opening pressure to the maximum pressure $p_s$ for the safe operation of the passive suspension system; then the controller outputs a control signal to the control end of the reversing valve to switch the reversing valve from the turning-off state to the turning-on state; at this time, $p_1=p_2$, the active suspension is smoothly switched to the passive suspension, the energy accumulator is used as the elastic element of the passive suspension, and the overflow valve is used as the safety valve of the passive suspension system; and at this time, the vehicle starts to travel, that is, travels in the passive suspension mode;

if $p_2>p_1$, the controller outputs a control signal to the power take-off, and the power take-off is reconnected to the output shaft of the vehicle engine and obtains power therefrom and outputs the power to the hydraulic pump, and the hydraulic pump operates, the oil flows into the energy accumulator via the one-way valve, the oil pressure in the energy accumulator rises; when the pressure monitored by the first pressure sensor rises to $p_2$, the controller stops outputting the control signal to the power take-off; the power take-off is disconnected from the output shaft of the vehicle engine; the hydraulic pump stops working, and then the controller outputs a control signal to the control end of the reversing valve, makes the reversing valve switch from the turning-off state to the turning-on state; at this time $p_1=p_2$, the active suspension is smoothly switched to the passive suspension, the energy accumulator is used as the elastic element of the passive suspension, and the overflow valve is used as the safety valve of the passive suspension system; and at this time, the vehicle starts to travel, that is, travels in the passive suspension mode; and when the vehicle is parked and the passive suspension is switched to the active suspension, the controller stops outputting the signal to the reversing valve; the reversing valve is switched from the turning-on state to the turning-off state, the oil is locked in the suspension cylinder, and subsequently the controller outputs a control signal to the overflow valve to adjust its opening pressure to $p_a$, and then the controller outputs a control signal to the power take-off, the power take-off is connected to the output shaft of the vehicle engine and obtains power therefrom and outputs the power to the hydraulic pump, and the hydraulic pump operates, the controller outputs a corresponding displacement command to the control end of the servo valve according to the feedback signal of the displacement sensor; after the servo valve has regulated the movement of the piston rod of the suspension cylinder to the middle position of its full stroke, the controller stops outputting the control signal to the control end of the servo valve, and the servo valve returns to the middle position state; to this end, the passive suspension has been smoothly switched to the active suspension state; the vehicle starts to travel, the controller outputs a corresponding control signal to the control end of the servo valve according to driving condition and vehicle body condition to regulate the operation thereof; at this time, the energy accumulator is used as an auxiliary power element of the active suspension, and the overflow valve is used as the safety valve of the active suspension system; and the vehicle starts to travel, that is, travels in an active suspension mode.

\* \* \* \* \*